United States Patent
Grabowski

(10) Patent No.: US 10,416,033 B2
(45) Date of Patent: Sep. 17, 2019

(54) LOAD INDICATING TUBE AND METHOD

(71) Applicant: Sonoco Development, Inc., Hartsville, SC (US)

(72) Inventor: Russell P. Grabowski, Pittsburgh, PA (US)

(73) Assignee: Sonoco Development, Inc., Hartsville, SC (US)

( * ) Notice: Subject to any disclaimer, the term of this patent is extended or adjusted under 35 U.S.C. 154(b) by 37 days.

(21) Appl. No.: 15/906,079

(22) Filed: Feb. 27, 2018

(65) Prior Publication Data

US 2018/0245995 A1    Aug. 30, 2018

Related U.S. Application Data

(60) Provisional application No. 62/464,910, filed on Feb. 28, 2017, provisional application No. 62/480,578, filed on Apr. 3, 2017.

(51) Int. Cl.

| | |
|---|---|
| *G01L 1/00* | (2006.01) |
| *G01L 1/24* | (2006.01) |
| *B65H 75/18* | (2006.01) |
| *B65H 75/10* | (2006.01) |

(52) U.S. Cl.
CPC .............. *G01L 1/247* (2013.01); *B65H 75/10* (2013.01); *B65H 75/182* (2013.01); *B65H 2701/52* (2013.01)

(58) Field of Classification Search
CPC ....... G01L 1/247; B65H 75/10; B65H 75/182; B65H 2701/52
USPC ..................................................... 73/862.51
See application file for complete search history.

(56) References Cited

U.S. PATENT DOCUMENTS

| | | | |
|---|---|---|---|
| 3,129,103 A | 4/1964 | Martel et al. | |
| 3,469,439 A | 9/1969 | Roberts et al. | |
| 3,948,141 A | 4/1976 | Shinjo | |
| 4,825,801 A * | 5/1989 | Weber | G09F 3/0376 116/201 |
| 4,936,916 A | 6/1990 | Shinmitsu et al. | |
| 5,209,515 A | 5/1993 | Dotson et al. | |
| 6,482,471 B1 * | 11/2002 | Suzuki | B41M 5/165 427/256 |
| 7,444,012 B2 | 10/2008 | White et al. | |
| 8,402,832 B2 | 3/2013 | Ribi | |
| 8,685,032 B2 * | 4/2014 | Melsheimer | A61B 17/8816 604/131 |
| 9,175,549 B2 * | 11/2015 | Paturu | E21B 33/06 |
| 2013/0333442 A1 * | 12/2013 | Kibat | G01L 1/247 73/12.09 |
| 2015/0037565 A1 | 2/2015 | Stolarz, Jr. et al. | |

FOREIGN PATENT DOCUMENTS

JP    2011207509 A    10/2011

* cited by examiner

*Primary Examiner* — Max H Noori
(74) *Attorney, Agent, or Firm* — Miller, Matthias & Hull LLP

(57) ABSTRACT

A hollow cylindrical tube having an outer surface coated with one or more inks is provided, each ink encapsulated in capsules that rupture under one or more specific loading conditions to display a visually perceptible color. The tube may be used to determine the load capabilities of the tube, to optimize the tube construction and to determine load magnitudes of windable materials and/or the winding process.

15 Claims, 7 Drawing Sheets

LOAD INDICATING TUBE AND METHOD

BACKGROUND

Field of the Invention

This patent relates to a load indicating tube. More particularly, this patent relates to a tube comprising an outer surface coated with one or more load indicating inks and a method of measuring the load on a tube.

Description of the Related Art

Tubes/cores made of spirally wound paper often are used to hold wound materials such as sheet materials or strand materials. These materials can exert a relatively high radial pressure on the core which can lead to undesirable deflection, distortion, buckling, crushing or other types of deformation of the core. It is desirable to know the load capabilities of the core, that is, how much pressure the core can withstand before significant deformation occurs.

One current method of measuring the load capability of a tube/core involves using multiple strain gauges to measure electrical resistance at various locations on a tube, then converts that data an estimate of the load capability of the tube. However, there are drawbacks to using strain gauges to test the load capability of a tube. The present disclosure addresses these drawbacks by eliminating the need for strain gauges and providing an instant visual indicator of tube stress and/or tube deformation.

SUMMARY OF THE INVENTION

The present disclosure relates to a hollow cylindrical tube having an outer surface coated with one or more inks, each ink encapsulated in capsules that rupture under one or more specific loading conditions to display a visually perceptible color. The tube may be used to determine the load capabilities of the tube, to optimize the tube construction and to determine load magnitudes of windable material and/or the winding process.

In one aspect the tube comprises a hollow cylindrical body having an outer surface and a first ink encapsulated in capsules that rupture under one or more specific loading conditions, such as pressure, to display a visually perceptible color.

In another aspect the tube further comprises a second ink encapsulated in capsules that rupture at a relatively higher predetermined pressure.

In another aspect a method for measuring load on a tube is disclosed, comprising the steps of: providing a tube having a hollow cylindrical body having an outer surface and an inner surface, at least a portion of the outer surface being coated with a first ink encapsulated in capsules that rupture under a first predetermined pressure to display a visually perceptible first color; winding a material around the tube; unwinding the material from the tube; and visually examining the tube to determine whether the outer surface displays the first color.

THE DRAWINGS

DETAILED DESCRIPTION OF THE INVENTION

Figure 1:
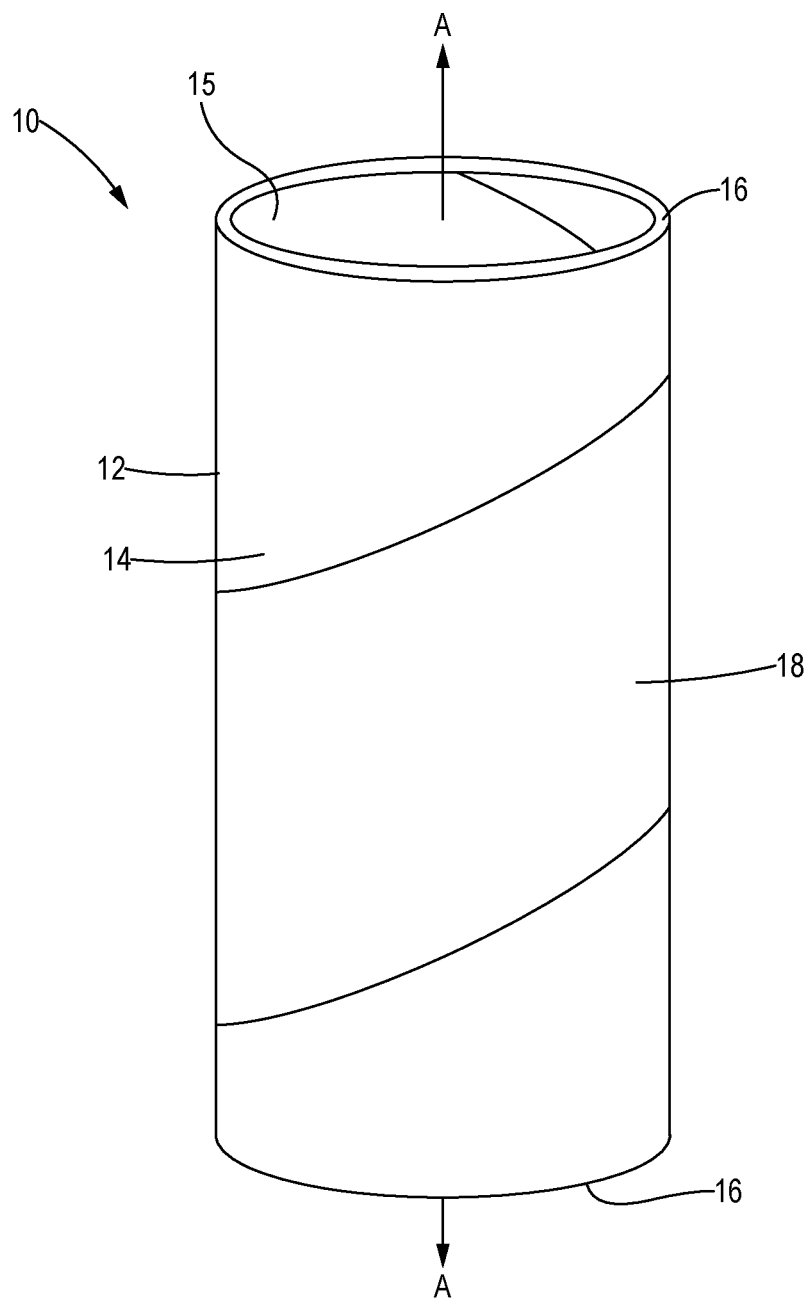
FIG. 1 is a perspective view of a tube.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

"Deformation" as used herein refers to any significant deformation, deflection, distortion, buckling or crushing caused by pressure on a tube.

Turning to the drawings, FIG. 1 is a perspective view of a tube 10, sometimes referred to as a core. The tube 10 may comprise a hollow cylindrical body 12 having an outer surface 14, an inner surface 15, opposing ends 16 and a middle section 18 equidistant the ends 16. The tube 10 also has an axial dimension extending from one end 16 to the other end 16 and a radial dimension extending radially outward from an axis A.

The tube 10 may be used to carry strand material, such as yarn, or sheet material such as fabric, foil or paper. Typical tubes for carrying textiles may have an outer diameter of three to four inches and may be about one foot in axial length, although the tubes may be any suitable dimensions depending on the application. The tube 10 may be made of spirally wound paper as is commonly known in the industry, although the tube may be made from any suitable material or combination of materials, including paper, plastic or even metal foil.

Figure 2:
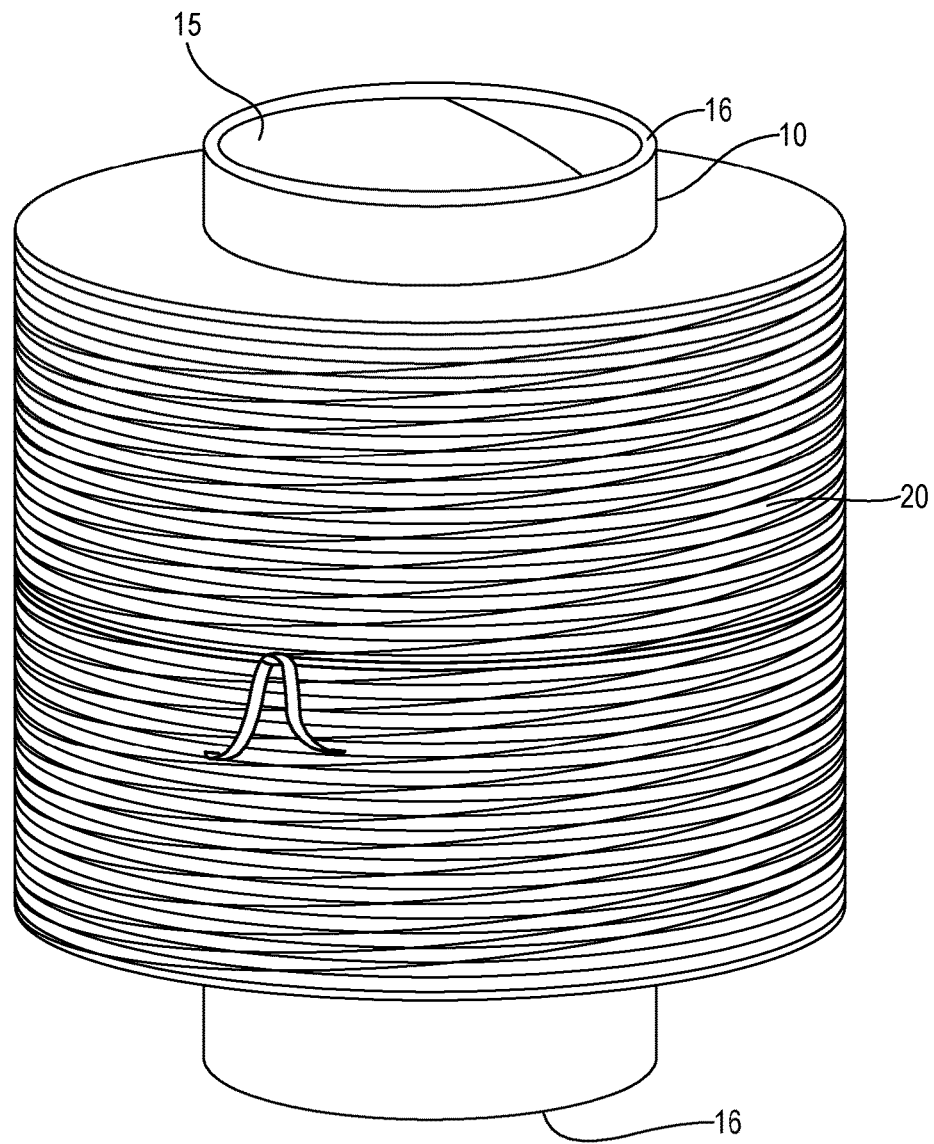
FIG. 2 is a perspective view of a tube carrying wound strand material.

If the tube 10 is to be used to carry a textile, the tube 10 may be sold to the textile manufacturer who then winds their product 20 on the tube 10. FIG. 2 is a perspective view of a tube 10 carrying wound strand material 20, for example, in this case, yarn. It should be understood that the product 20 can be any product suitable for wrapping or winding around a tube or core, including but not limited to strands, films and tapes.

Figure 3:
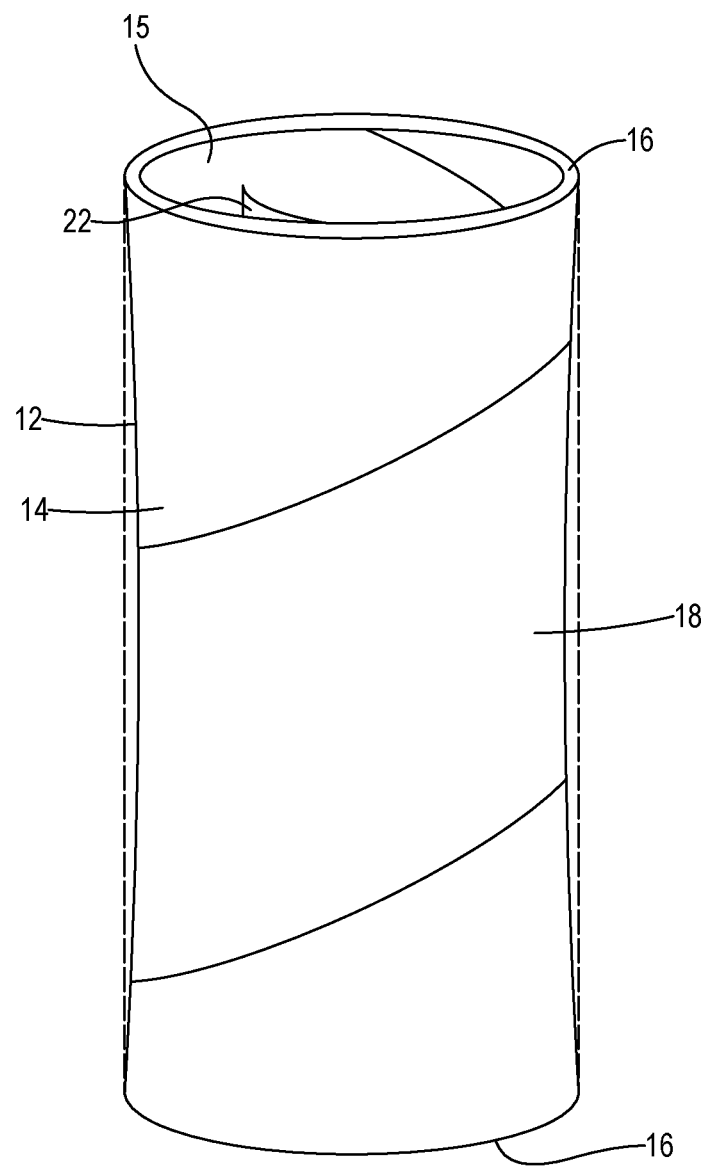
FIG. 3 is a perspective view of a tube showing deformation due to radial pressure.

FIG. 3 is a perspective view of a tube 10 showing deformation due to a high radial pressure. The middle section 18 has collapsed slightly inwardly in the radial direction causing the tube 10 to assume an hourglass shape. One or more buckling regions 22 may be observed in the inner surface 15 of the tube 10.

It is desirable to know the load capabilities of the tube 10, that is, how much radial pressure the tube 10 can withstand before the tube has reached an undesirable level of deformation. Therefore a tube 10 has been developed that includes "smart ink" technology. As explained in more detail below, "smart ink" technology refers to the fact that the tube 10 includes one or more "smart inks" disposed on its outer surface 14.

The "smart inks" may be inks or paints or any fluid that carries a coloring agent such as a pigment. Each smart ink may be microencapsulated within a microcapsule designed to rupture under specific loading conditions, such as pressure or stress. The microencapsulated inks are disposed on the outer surface 14 of the tube 10, preferably as an even coating. Each microencapsulated ink may be mixed with an adhesive or other material that enables the ink to coat and adhere to the outer surface 14 of the tube 10.

For example, the outer surface 14 may be covered with a first, low pressure ink 30, encapsulated in capsules that burst when subjected to a predetermined, relatively low pressure of, say, 50 psi, revealing a first visually perceptible color. The outer surface 14 may be covered with a second, high pressure ink 32, encapsulated in capsules that burst when subjected to a relatively higher level of pressure, say, 100 psi, revealing a second visually perceptible color. When a sufficient pressure is applied to the outer surface 14 of the tube 10 from, for example, wound yarn 20, the microcapsules break and the ink color becomes visible along that area.

The tube 10 may also include a background ink having a pigment that provides a simple background color to the unstressed tube 10. Under no loading, only the outer surface color of the tube 10 may be visible. If a background ink is used, the simple background color of the background ink may be visible. Background colors may be used to indicate the particular application for which the tube 10 is intended.

EXAMPLES

Figure 4:
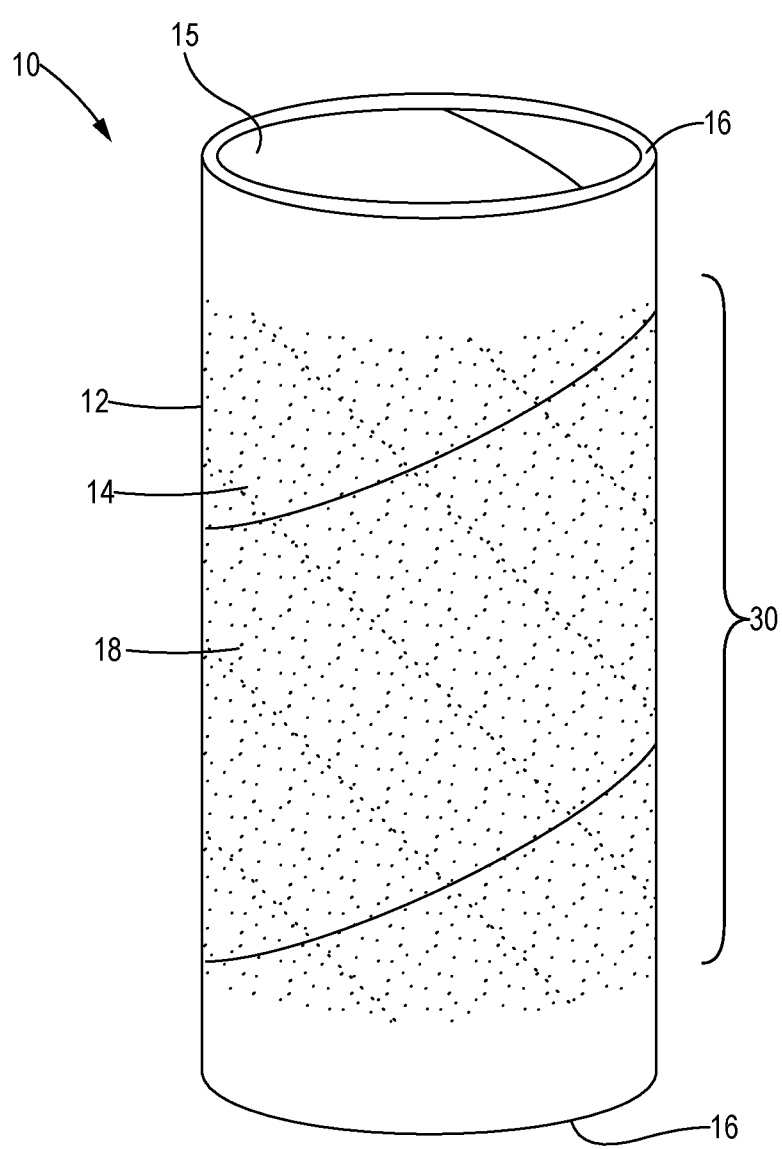
FIG. 4 is a perspective view of a tube after use, that is, after wound product has been removed.

FIG. 4 is a perspective view of a tube 10 after use, that is, after carrying a wound product 20. Prior to use the outer surface 14 of the tube 10 was coated with a first ("low pressure") ink 30 encapsulated in capsules that burst at 50 psi to exhibit a first color 30 and a second ("high pressure") ink 32 encapsulated in capsules that burst at 100 psi to exhibit a second color 32. After use the tube 10 has a single, relatively wide, annular region 30 corresponding or overlapping with the middle 18 of the tube 10 that exhibits the first ("low pressure") color 30 due to the breakage of the microcapsules containing the first, low pressure ink 30. The second "high pressure" color 32 is not visible. It may be concluded that the region of the tube 10 displaying the first color 30 has been subjected to a pressure between 50 and 100 psi. Since the tube 10 has not been deformed, that is, has not been crushed or otherwise damaged, it may be concluded that the tube 10 is adequately designed for this particular winding application.

Figure 5:
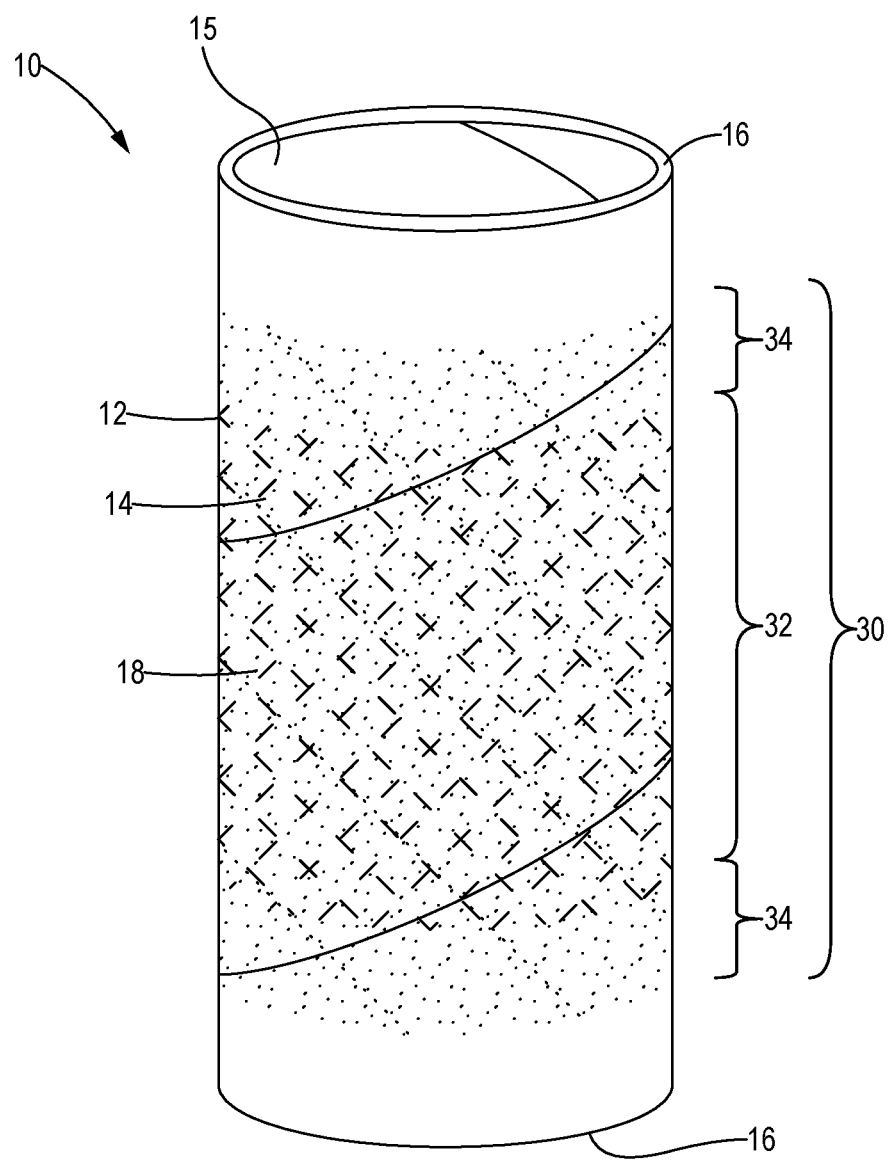
FIG. 5 is a perspective view of another tube after use.

FIG. 5 is a perspective view of another tube 10 after use, that is, after the wound product 20 has been removed. Like the tube 10 in FIG. 4, the tube 10 has a wide annular region 30 that exhibits the first "low pressure" color 30 due to the breakage of the microcapsules containing the first, low pressure ink 30. In addition, the tube 10 also has a narrower annular middle region 32 overlapping the first region 30 that exhibits both the first color 30 and the second color 32 due to the breakage of the microcapsules containing the second, high pressure ink 32. If the microcapsules containing the first ink burst at 50 psi and the microcapsules containing the second ink burst at 100 psi, it is apparent that annular regions 34 of the tube 10 above and below the high pressure region 32 displaying only the first (low pressure) color have been subjected to a pressure between 50 and 100 psi, while the middle region 32 of the tube 10 displaying both colors has been subjected to a pressure of at least 100 psi. Since the tube 10 has not deformed, that is, has not undergone significant deformation, deflection, distortion, buckling or crushing, it may be concluded that this particular tube 10 is adequately designed for this particular winding application.

Figure 6:
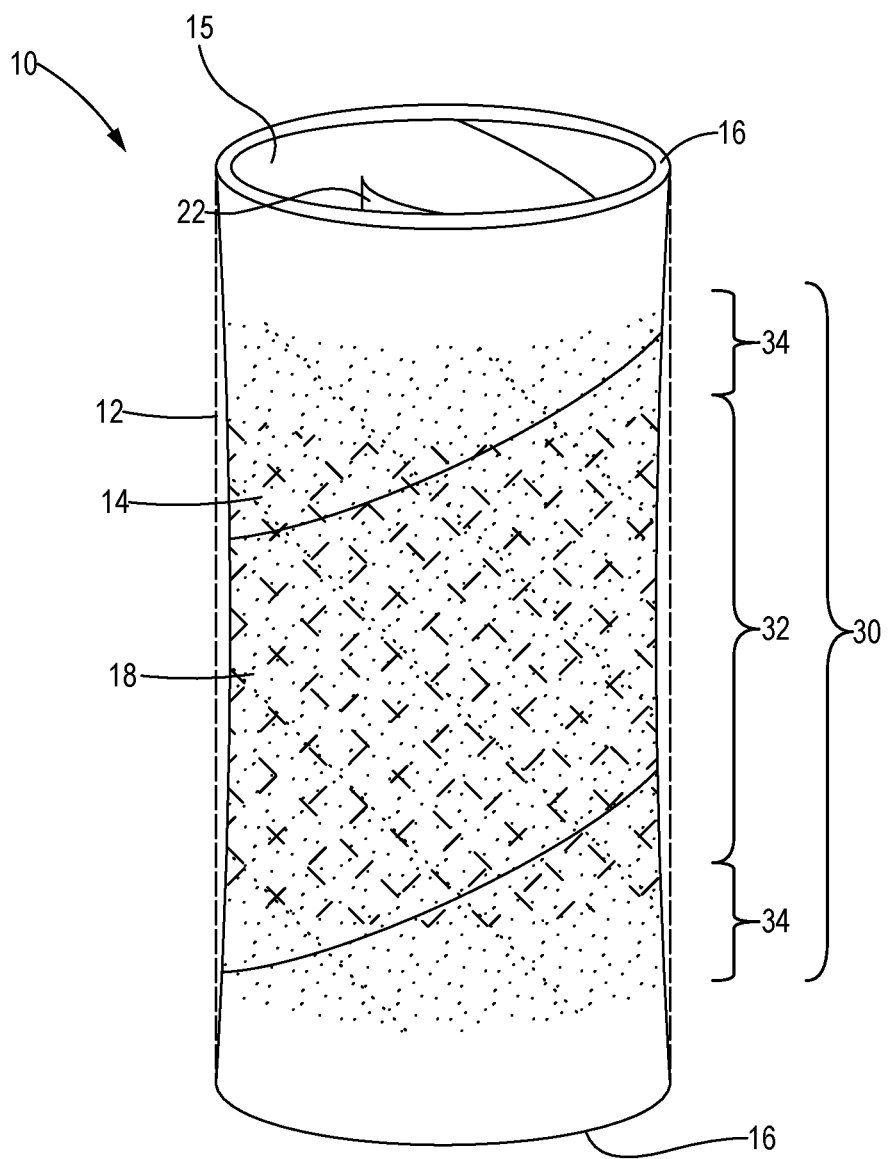
FIG. 6 is a perspective view of still another tube after use.

FIG. 6 is a perspective view of another tube 10 after use, that is, after the wound product 20 has been removed. Like the tube 10 in FIG. 5, the tube 10 shows a large annular region that exhibits the first "low pressure" color 30 due to the breakage of the microcapsules containing the first, low pressure ink, and a smaller annular middle region 32 overlapping the first region 30 that exhibits both the first color 30 and the second color 32 due to the additional breakage of the microcapsules containing the second, high pressure ink. If the microcapsules containing the first ink burst at 50 psi and the microcapsules containing the second ink burst at 100 psi, it is apparent that annular regions 34 of the tube 10 displaying only the first color 30 have been subjected to a pressure between 50 and 100 psi while the middle region 32 of the tube 10 displaying both colors has been subjected to a pressure of at least 100 psi. In this example, the tube 10 has undergone significant deformation, as evidenced by the middle section 18 which has collapsed slightly inwardly in the radial direction and the buckling region 22 on the inner surface 15 of the tube 10. It may be concluded that this particular tube 10 is inadequately designed for this particular winding application, and that the tube 10 should be redesigned so that the middle section 18 can withstand a higher radial pressure.

Figure 7:
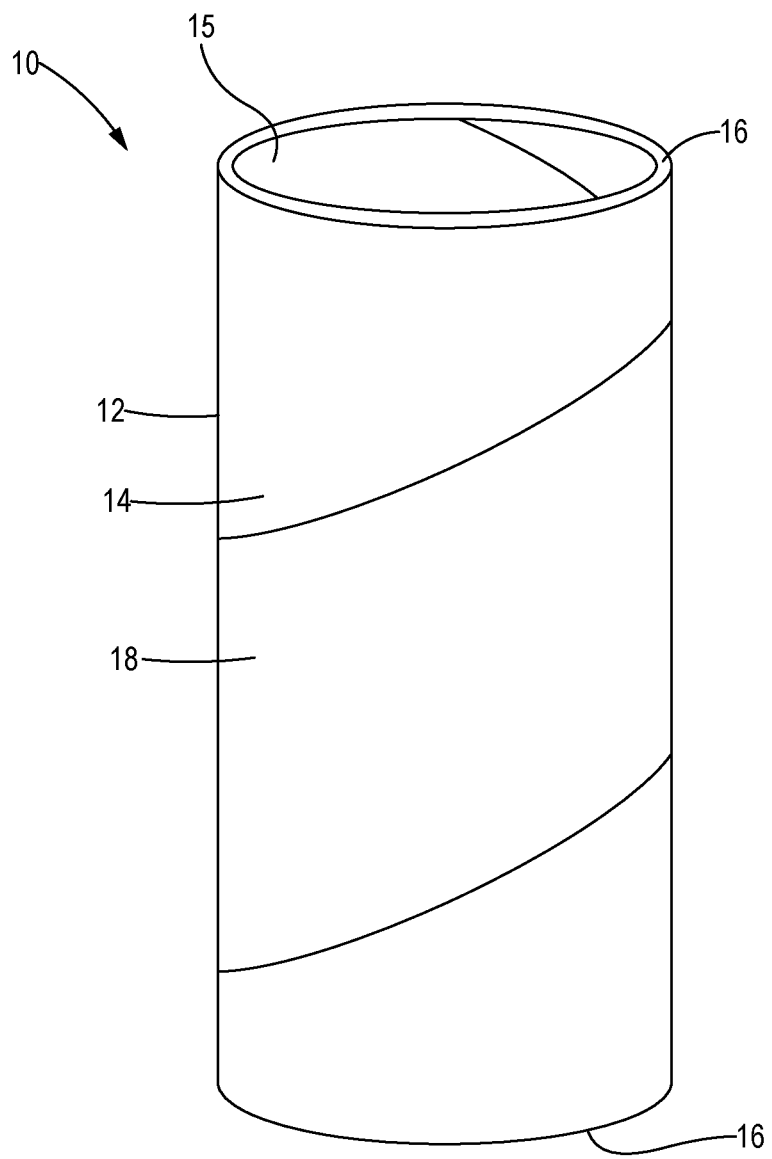
FIG. 7 is a perspective view of yet another tube after use.

FIG. 7 is a perspective view of another tube 10 after use, that is, after the wound product 20 has been removed. Like the tubes 10 in FIGS. 4-6, the outer surface 14 of the tube 10 was coated with a first ("low pressure") ink 30 encapsulated in capsules that burst at 50 psi to exhibit a first color 30 and a second ("high pressure") ink 32 encapsulated in capsules that burst at 100 psi to exhibit a second color 32. Since the tube 10 is not deformed, and since neither the low pressure color 30 or the high pressure color 32 is visible on the outer surface 14 of the tube 10, it may be concluded that the tube 10 is capable of withstanding the higher pressure, that is, 100 psi, without undergoing deformation. Such a tube 10 may be appropriate for applications requiring a tube that can withstand the higher 100 psi radial pressure, but might be considered to be "over-designed" for applications requiring a tube that need withstand only the lower 50 psi radial pressure. It may also be concluded that the load magnitudes of the windable material and the winding process, that is, the radial pressures exerted on the tube 10 as a result of the winding material and winding process, was less than 50 psi.

Method of Use

The tube 10 may be used in the following manner:

First, a tube 10 is provided having one or more smart inks as described above. The number of smart inks may be any suitable number, and need not be limited to one or two. Each smart ink may be applied to the outer surface 14 of the tube 10 in any suitable manner, including with a roller or a spraying apparatus. For example, the tube 10 may be rotated on a mandrel while one or more inks are applied with a spray apparatus. Where at least two inks are used, the portion of the outer surface 14 that is coated with the first ink may be the same as or different from the portion of the outer surface 14 that is coated with the second ink. The outer surface 14 of the tube 10 may also be coated with a background ink.

Next, material 20 is wound around the tube 10. This may be done by the tube manufacturer for, say, testing purposes, or by the material manufacturer, or by anyone. The wound material 20 may be strand material or sheet material, and may be wound onto the tube 10 using any suitable method.

After the wound material 20 is unwound, the tube 10 may now be visually examined. The outer surface 14 may display the hidden color(s) of the pressure sensitive inks in a pattern indicative of the pressures and/or stresses applied to the tube 10. As explained above, each color corresponds to a particular predetermined threshold pressure. The color pattern results may be used, for example, to determine if the tube has been properly designed for a particular application, or to optimize the tube design. The color pattern results may also be used to determine load magnitudes of windable materials and/or the winding process.

Alternatively, instead of winding material 20 around the tube 10, the tube 10 may be subjected to radial or axial pressure or other loading conditions by other means, such as by applying axial or radial pressure with rods or plates.

INDUSTRIAL APPLICABILITY

Thus there has been described a hollow cylindrical tube having an outer surface coated with one or more inks. Each ink is micro-encapsulated in capsules that rupture under one or more specific loading conditions to display a visually perceptible color, pattern or other visual indicator.

Also described herein is a method to determine the load capabilities of a three-dimensional article such as a cylindrical tube. The method also can be used to optimize tube construction and to determine load magnitudes of windable materials and/or the winding process. The method uses micro-encapsulated inks that rupture under one or more specific loading conditions to provide an instant means of indicating the load capability of a tube or core. The method eliminates the need to climatize the tube/core and the need for the user to return the loaded tube to the tube manufacturer for stress analysis.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A tube comprising:
   a hollow cylindrical body having an outer surface;
   a first ink, encapsulated in capsules that rupture under one or more specific loading conditions to display a visually perceptible color; and
   a background ink disposed on the outer surface, the background ink imparting a background color to the tube under unstressed conditions.

2. The tube of claim 1 wherein the one or more specific loading conditions is pressure.

3. The tube of claim 1 wherein the one or more specific loading conditions is deformation of the cylindrical body.

4. The tube of claim 2 wherein the first ink is encapsulated in capsules that rupture at a first predetermined pressure.

5. The tube of claim 4 further comprising:
   a second ink, encapsulated in capsules that rupture at a second predetermined pressure higher than the first predetermined pressure.

6. The tube of claim 1 wherein the tube is made of spirally wound paper.

7. A method for measuring load on a tube comprising the steps of:
   providing a tube having a hollow cylindrical body having an outer surface and an inner surface, at least a portion of the outer surface being coated with a first ink encapsulated in capsules that rupture under a first predetermined pressure to display a visually perceptible first color;
   winding a material around the tube;
   removing at least some of the material from the tube; and
   visually examining the tube to determine whether the outer surface displays the first color.

8. The method of claim 7 comprising the further step of:
   determining whether the tube has deformed.

9. The method of claim 8 wherein the determining step comprises determining whether the outer surface of the tube has collapsed inwardly or the inner surface of the tube 10 has buckled.

10. The method of claim 7 wherein the material is in the form of a strand.

11. The method of claim 7 wherein the material is in the form of a sheet.

12. The method of claim 7 wherein at least a portion of the outer surface is coated with a second ink encapsulated in capsules that rupture under a second predetermined pressure to display a visually perceptible second color.

13. The method of claim 12 wherein the second predetermined pressure is higher than the first predetermined pressure.

14. The method of claim 12 wherein the portion of the outer surface that is coated with the first ink is the same as the portion of the outer surface that is coated with the second ink.

15. The method of claim 12 wherein the portion of the outer surface that is coated with the first ink is different from the portion of the outer surface that is coated with the second ink.

* * * * *